US009666115B2

(12) United States Patent
Zhang et al.

(10) Patent No.: US 9,666,115 B2
(45) Date of Patent: May 30, 2017

(54) IMAGE CONVERSION METHOD AND APPARATUS FOR CONVERTING RGB SIGNAL TO RGBW SIGNAL (71) Applicant: BOE TECHNOLOGY GROUP CO., LTD., Beijing (CN)

(72) Inventors: Chen Zhang, Beijing (CN); Fei Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/443,495

(22) PCT Filed: Oct. 10, 2014

(86) PCT No.: PCT/CN2014/088307
§ 371 (c)(1),
(2) Date: May 18, 2015

(87) PCT Pub. No.: WO2015/180363
PCT Pub. Date: Dec. 3, 2015

(65) Prior Publication Data
US 2016/0267828 A1    Sep. 15, 2016

(30) Foreign Application Priority Data
May 30, 2014    (CN) .......................... 2014 1 0241038

(51) Int. Cl.
G09G 5/02    (2006.01)
G09G 3/20    (2006.01)
(Continued)

(52) U.S. Cl.
CPC ........... *G09G 3/2003* (2013.01); *H04N 9/646* (2013.01); *H04N 9/67* (2013.01);
(Continued)

(58) Field of Classification Search
CPC ...... G09G 3/3208; G09G 3/3225; G09G 3/36; G09G 5/10; G09G 3/20
See application file for complete search history.

(56) References Cited

U.S. PATENT DOCUMENTS

2007/0164664 A1* 7/2007 Ludwicki ............. G09G 3/2003
313/504
2009/0207182 A1    8/2009 Takada et al.
(Continued)

FOREIGN PATENT DOCUMENTS

CN    101510389 A    8/2009
CN    103218988 A    7/2013
(Continued)

OTHER PUBLICATIONS

International Search Report Appln. No. PCT/CN2014/088307; Dated Feb. 27, 2015.
(Continued)

*Primary Examiner* — Phi Hoang
(74) *Attorney, Agent, or Firm* — Ladas & Parry LLP (57)    ABSTRACT The present disclosure discloses an image conversion method for converting RGB signal to RGBW signal and an apparatus thereof. A substitution rate of a W luminance output value of respective pixels in each frame is determined according to RGB luminance input values of the respective pixels in each frame, and accumulated proportions of RGB luminance output values and the W luminance output value in RGBW luminance output values of the respective pixels within a preset time before each frame. The RGBW luminance output values of the respective pixels in each frame is determined according to the determined substitution rate of the W luminance output value and the RGB luminance input values of the respective pixels in each frame. In this way, the RGBW luminance output values of the respective pixels in the present frame can be adjusted according to a utilization (Continued)

rate of respective sub-pixels in the respective pixels within a period of time before each frame, so as to substantially maintain working lives of the respective sub-pixels in the respective pixels uniform as far as possible, and to further improve a service life of an entire display.

14 Claims, 3 Drawing Sheets

(51) Int. Cl.
    *H04N 9/64*       (2006.01)
    *H04N 9/67*       (2006.01)

(52) U.S. Cl.
    CPC .............. *G09G 2300/0452* (2013.01); *G09G 2320/0276* (2013.01); *G09G 2320/048* (2013.01); *G09G 2340/06* (2013.01)

(56) References Cited

U.S. PATENT DOCUMENTS

2014/0285542 A1\*   9/2014   Izumi .................. G09G 3/2003
                                                      345/694
2014/0333683 A1\*   11/2014   Qi ........................ G09G 3/3233
                                                      345/690
2015/0154762 A1     6/2015   Yang et al.

FOREIGN PATENT DOCUMENTS

CN           104023219 A      9/2014
KR         20130030598 A      3/2013

OTHER PUBLICATIONS

Written Opinion of the International Searching Authority Appln. No. PCT/CN2014/088307; Dated Feb. 27, 2015.

\* cited by examiner

IMAGE CONVERSION METHOD AND APPARATUS FOR CONVERTING RGB SIGNAL TO RGBW SIGNAL

TECHNICAL FIELD

The present disclosure relates to a field of display technology, and more particularly, to an image conversion method for converting RGB signal to RGBW signal and an image conversion apparatus thereof.

BACKGROUND

At present, in an image display apparatus such as a Liquid Crystal Display (LCD) and an Organic Light Emitting Diode (OLED), a pixel unit is composed of a red (R) sub-pixel unit, a green (G) sub-pixel unit, and a blue (B) sub-pixel unit, and color desired to be displayed is obtained by mixing through controlling a gray-scale value of each sub-pixel unit so as to display a color image. Since luminous efficiency of three primary colors RGB is low, product optimization of a display device based on the three primary colors RGB will be restricted. On such basis, a pixel unit composed of the red (R) sub-pixel unit, the green (G) sub-pixel unit, the blue (B) sub-pixel unit and a white (W) sub-pixel unit appears, to improve the luminous efficiency of the RGB display. However, signal transmission interfaces, such as a Video Graphics Array (VGA) interface and a Digital Video Interface (DVI), all transmit an RGB signal. If the RGB signal is directly applied to an RGBW display, image distortion will be caused. Therefore, it is necessary to convert the RGB signals inputted to the RGBW display.

The four types of sub-pixel units in each frame of display have different working strengths and working time, so that working lives of the four types of sub-pixel units are not uniform, wherein the working life of the sub-pixel unit with the shortest working life represents a service life of the entire display. In a conventional image conversion method for converting RGB signal to RGBW signal, although the working lives of the three types of sub-pixel units, i.e., the red (R) sub-pixel unit, the green (G) sub-pixel unit and the blue (B) sub-pixel unit can be improved by adding the white (W) sub-pixel unit, since the working lives of the four types of sub-pixel units are not uniform, the service life of the entire display cannot be effectively improved.

Therefore, how to effectively improve the service life of the entire display is a technical problem urgent to be solved by those skilled in the art.

SUMMARY OF THE INVENTION

In view of the above, embodiments of the present disclosure provide an image conversion method for converting RGB signal to RGBW signal and an image conversion apparatus thereof, for effectively improving the service life of the entire display.

Thus, according to a first aspect of the embodiments of the present disclosure, there is provided an image conversion method for converting RGB signal to RGBW signal, comprising: converting received RGB input signals of respective pixels in each frame into corresponding RGB luminance input values, respectively; determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame; determining the RGBW luminance output values of the respective pixels in each frame, according to the determined substitution rate of the W luminance output value and the RGB luminance input values of the respective pixels in each frame; converting the determined RGBW luminance output values of the respective pixels in each frame into corresponding RGBW output signals, respectively, and outputting the same.

By using the above-described image conversion method for converting RGB signal to RGBW signal provided by the embodiment of the present disclosure, the RGBW luminance output values of the respective pixels in the present frame can be adjusted according to a utilization rate of respective sub-pixels in the respective pixels within a period of time before each frame, so as to substantially maintain the working lives of the respective sub-pixels in the respective pixels uniform as far as possible, and to further improve the service life of the entire display.

In combination with the first aspect, in an implementation mode of the first aspect, the determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame may specifically include: determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum; determining a second sub-pixel whose RGB luminance input value is minimum among RGB luminance input values of the respective pixels in each frame; increasing the substitution rate of the W luminance output value in the frame, when it is determined that the accumulated proportion of the luminance output value of the first sub-pixel is greater than a first threshold and that the first sub-pixel is the second sub-pixel; maintaining the substitution rate of the W luminance output value in the frame, when it is determined that the accumulated proportion of the luminance output value of the first sub-pixel is greater than the first threshold and that the first sub-pixel is different from the second sub-pixel; reducing the substitution rate of the W luminance output value in the frame, when it is determined that the accumulated proportion of the W luminance output value is greater than a second threshold; maintaining the substitution rate of the W luminance output value in the frame, when it is determined that any two or more of conditions that an accumulated proportion of an R luminance output value is greater than the first threshold, an accumulated proportion of a G luminance output value is greater than the first threshold, an accumulated proportion of a B luminance output value is greater than the first threshold, and the accumulated proportion of the W luminance output value is greater than the second threshold, are satisfied.

In combination with the first aspect and the above-described implementation mode thereof, in another implementation mode of the first aspect, the determining the RGBW luminance output values of the respective pixels in each frame, according to the determined substitution rate of the W luminance output value and the RGB luminance input values of the respective pixels in each frame, may specifically include: calculating the RGBW luminance output values of the respective pixels in each frame by formulae below, when it is determined that the accumulated proportion of the R luminance output value is greater than the first threshold:

$$L_R=L_r-K_{W'}L_r;$$

$$L_G=L_g-K_{W'}L_r;$$

$$L_B=L_b-K_{W'}L_r;$$

$$L_W=K_{W'}L_r;$$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

In combination with the first aspect and the above-described implementation modes thereof, in another implementation mode of the first aspect, the determining the RGBW luminance output values of the respective pixels in each frame, according to the determined substitution rate of the W luminance output value and the RGB luminance input values of the respective pixels in each frame, may specifically include: calculating the RGBW luminance output values of the respective pixels in each frame by formulae below, when it is determined that the accumulated proportion of the G luminance output value is greater than the first threshold:

$$L_R=L_r-K_{W'}L_g;$$

$$L_G=L_g-K_{W'}L_g;$$

$$L_B=L_b-K_{W'}L_g;$$

$$L_W=K_{W'}L_g;$$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

In combination with the first aspect and the above-described implementation modes thereof, in another implementation mode of the first aspect, the determining the RGBW luminance output values of the respective pixels in each frame, according to the determined substitution rate of the W luminance output value and the RGB luminance input values of the respective pixels in each frame, may specifically include: calculating the RGBW luminance output values of the respective pixels in each frame by formulae below, when it is determined that the accumulated proportion of the B luminance output value is greater than the first threshold:

$$L_R=L_r-K_{W'}L_b;$$

$$L_G=L_g-K_{W'}L_b;$$

$$L_B=L_b-K_{W'}L_b;$$

$$L_W=K_{W'}L_b;$$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

In combination with the first aspect and the above-described implementation modes thereof, in another implementation mode of the first aspect, the determining the RGBW luminance output values of the respective pixels in each frame, according to the determined substitution rate of the W luminance output value and the RGB luminance input values of the respective pixels in each frame, may specifically include: calculating the RGBW luminance output values of the respective pixels in each frame by formulae below, when it is determined that the accumulated proportion of the W luminance output value is greater than the second threshold:

$$L_R=L_r-K_{W'}L_x;$$

$$L_G=L_g-K_{W'}L_x;$$

$$L_B=L_b-K_{W'}L_x;$$

$$L_W=K_{W'}L_x;$$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; $L_x$ represents a luminance input value of the second sub-pixel of the respective pixels in each frame; and $K_{W''}$ represents the substitution rate of the W luminance output value of the respective pixels in each frame.

In combination with the first aspect and the above-described implementation modes thereof, in another implementation mode of the first aspect, the first threshold may be ⅓-0.6, and the second threshold may be 0.4-0.6.

According to a second aspect of the embodiments of the present disclosure, there is provided an image conversion apparatus for converting RGB signal to RGBW signal. The image conversion apparatus comprises: a signal receiving unit, for receiving RGB input signals of respective pixels in each frame; a converting unit, for converting the received RGB input signals of the respective pixels in each frame into corresponding RGB luminance input values, respectively; a substitution rate determining unit, for determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame; a luminance output value determining unit, for determining the RGBW luminance output values of the respective pixels in each frame, according to the determined substitution rate of the W luminance output value and the RGB luminance input values of the respective pixels in each frame; an inverse converting unit, for converting the determined RGBW luminance output values of the respective pixels in each frame into corresponding RGBW output signals, respectively; and a signal output unit, for outputting the RGBW output signals of the respective pixels in each frame.

In combination with the second aspect, in an implementation mode of the second aspect, the substitution rate determining unit may include: a first determining sub-unit, for determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum; a second determining sub-unit, for determining a second sub-pixel whose RGB luminance input value is minimum among RGB luminance input values of the respective pixels in each frame; a first processing sub-unit, for increasing the substitution rate of the W luminance output value in the frame, when it is determined that the accumulated proportion of the luminance output value of the first sub-pixel is greater than a first threshold, and that the first sub-pixel is the second sub-pixel; a second processing sub-unit, for maintaining the substitution rate of the W luminance output value in the frame, when it is determined that the accumulated proportion of the luminance output value of the first sub-pixel is greater than the first threshold, and that the first sub-pixel is different from the second sub-pixel; a third processing sub-unit, for reducing the substitution rate of the W luminance output value in the frame, when it is determined that the accumulated proportion of the W luminance output value is greater than a second threshold; a fourth processing sub-unit, for maintaining the substitution rate of the W luminance output value in the frame, when it is determined that any two or more of conditions that an accumulated proportion of an R luminance output value is greater than the first threshold, an accumulated proportion of a G luminance output value is greater than the first threshold, an accumulated proportion of a B luminance output value is greater than the first threshold, and the accumulated proportion of the W luminance output value is greater than the second threshold, are satisfied.

In combination with the second aspect and the above-described implementation mode thereof, in another implementation mode of the second aspect, the luminance output value determining unit may be specifically used for calculating the RGBW luminance output values of the respective pixels in each frame by formulae below, when it is determined that the accumulated proportion of the R luminance output value is greater than the first threshold:

$L_R = L_r - K_W L_r;$ $L_G = L_g - K_W L_r;$ $L_B = L_b - K_W L_r;$ $L_W = K_W L_r;$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W''}$ represents the substitution rate of the W luminance output value of the respective pixels in each frame.

In combination with the second aspect and the above-described implementation modes thereof, in another implementation mode of the second aspect, the luminance output value determining unit may be specifically used for calculating the RGBW luminance output values of the respective pixels in each frame by formulae below, when it is determined that the accumulated proportion of the G luminance output value is greater than the first threshold:

$L_R = L_r - K_W L_g;$ $L_G = L_g - K_W L_g;$ $L_B = L_b - K_W L_g;$ $L_W = K_W L_g;$

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W''}$ represents the substitution rate of the W luminance output value of the respective pixels in each frame.

In combination with the second aspect and the above-described implementation modes thereof, in another implementation mode of the second aspect, the luminance output value determining unit may be specifically used for calculating the RGBW luminance output values of the respective pixels in each frame by formulae below, when it is determined that the accumulated proportion of the B luminance output value is greater than the first threshold:

$L_R = L_r - K_W L_b$;

$L_G = L_g - K_W L_b$;

$L_B = L_b - K_W L_b$;

$L_W = K_W L_b$;

Where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W''}$ represents the substitution rate of the W luminance output value of the respective pixels in each frame.

In combination with the second aspect and the above-described implementation modes thereof, in another implementation mode of the second aspect, the luminance output value determining unit may be specifically used for calculating the RGBW luminance output values of the respective pixels in each frame by formulae below, when it is determined that the accumulated proportion of the W luminance output value is greater than the second threshold:

$L_R = L_r - K_W L_x$;

$L_G = L_g - K_W L_x$;

$L_B = L_b - K_W L_x$;

$L_W = K_W L_x$;

Where, $L_R$ represents a red luminance output value in the RGBW luminance output values of the respective pixels in each frame, $L_G$ represents a green luminance output value in the RGBW luminance output values of the respective pixels in each frame. $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; $L_x$ represents a luminance input value of the second sub-pixel of the respective pixels in each frame; and $K_{W''}$ represents the substitution rate of the W luminance output value of the respective pixels in each frame.

In combination with the second aspect and the above-described implementation modes thereof, in another implementation mode of the second aspect, the first threshold may be ⅓-0.6, and the second threshold may be 0.4-0.6.

DESCRIPTION OF THE EMBODIMENTS

Hereinafter, specific implementation modes of the image conversion method for converting RGB signal to RGBW signal and the image conversion apparatus thereof provided by the embodiments of the present disclosure will be described in detail in conjunction with the accompanying drawings.

Figure 1:
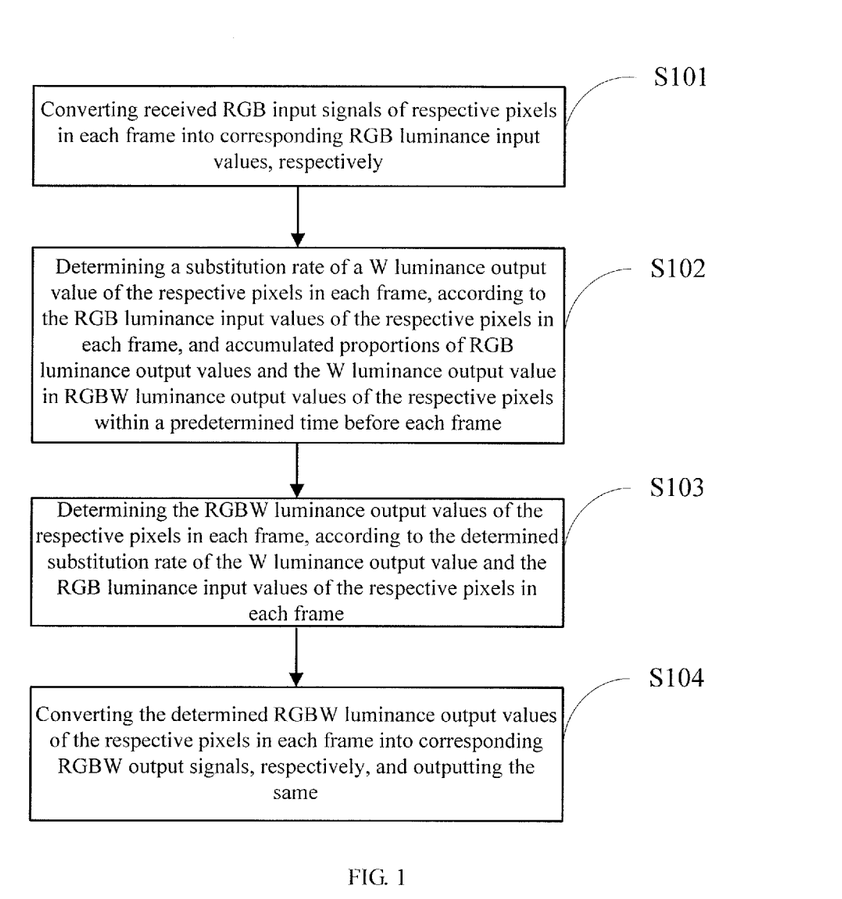
FIG. 1 is a flow chart of an image conversion method for converting RGB signal to RGBW signal provided by an embodiment of the present disclosure.

The image conversion method for converting RGB signal to RGBW signal provided by an embodiment of the present disclosure, as shown in FIG. 1, specifically comprises steps of: S101: converting received RGB input signals of respective pixels in each frame into corresponding RGB luminance input values, respectively; S102: determining a substitution rate of a W luminance output value of the respective pixels in each frame, according to the RGB luminance input values of the respective pixels in each frame and accumulated proportions of RGB luminance output values and the W luminance output value in RGBW luminance output values of the respective pixels within a preset time before each frame; S103: determining the RGBW luminance output values of the respective pixels in each frame, according to the determined substitution rate of the W luminance output value and the RGB luminance input values of the respective pixels in each frame; S104: converting the determined RGBW luminance output values of the respective pixels in each frame into corresponding RGBW output signals, respectively, and outputting the same.

By using the above-described image conversion method for converting RGB signal to RGBW signal provided by the embodiment of the present disclosure, the RGBW luminance output values of the respective pixels in the present frame can be adjusted according to a utilization rate of respective sub-pixels in the respective pixels within a period of time before each frame, so as to substantially maintain the working lives of the respective sub-pixels in the respective pixels uniform as far as possible, and to further improve the service life of the entire display.

Hereinafter, specific implementation modes of the respective steps of the image conversion method provided by the embodiment of the present disclosure will be described in detail.

In the embodiment below, the RGB input signal takes an 8-bit input signal as an example, i.e., data signals corresponding to the three colors R, G and B can be represented by gray-scale values within 0~255.

Step S101 of converting the received RGB input signals of the respective pixels in each frame into the corresponding RGB luminance input values in the above-described method provided by the embodiment of the present disclosure can be implemented in a mode of gamma conversion in actual implementation. That is, the received RGB input signals of the respective pixels in each frame can be converted into the corresponding RGB luminance input values by formulae below:

$$L_r = L_{R\,max} \times \left(\frac{R_i}{255}\right)^\gamma; L_g = L_{G\,max} \times \left(\frac{G_i}{255}\right)^\gamma; L_b = L_{B\,max} \times \left(\frac{B_i}{255}\right)^\gamma;$$

Where, $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; $R_i$ represents a red input signal value in the RGB input signals of the respective pixels in each frame, $G_i$ represents a green input signal value in the RGB input signals of the respective pixels in each frame, $B_i$ represents a blue input signal value in the RGB input signals of the respective pixels in each frame; $L_{Rmax}$ represents a red luminance maximum value, $L_{Gmax}$ represents a green luminance maximum value, $L_{Bmax}$ represents a blue luminance maximum value, and $\gamma$ represents a gamma conversion factor.

Upon actual calculation, the gamma conversion factor $\gamma$ is generally set to 2.2, and of course, it may also be set to any other numerical value according to actual requirements, which will not be limited here.

Figure 2:
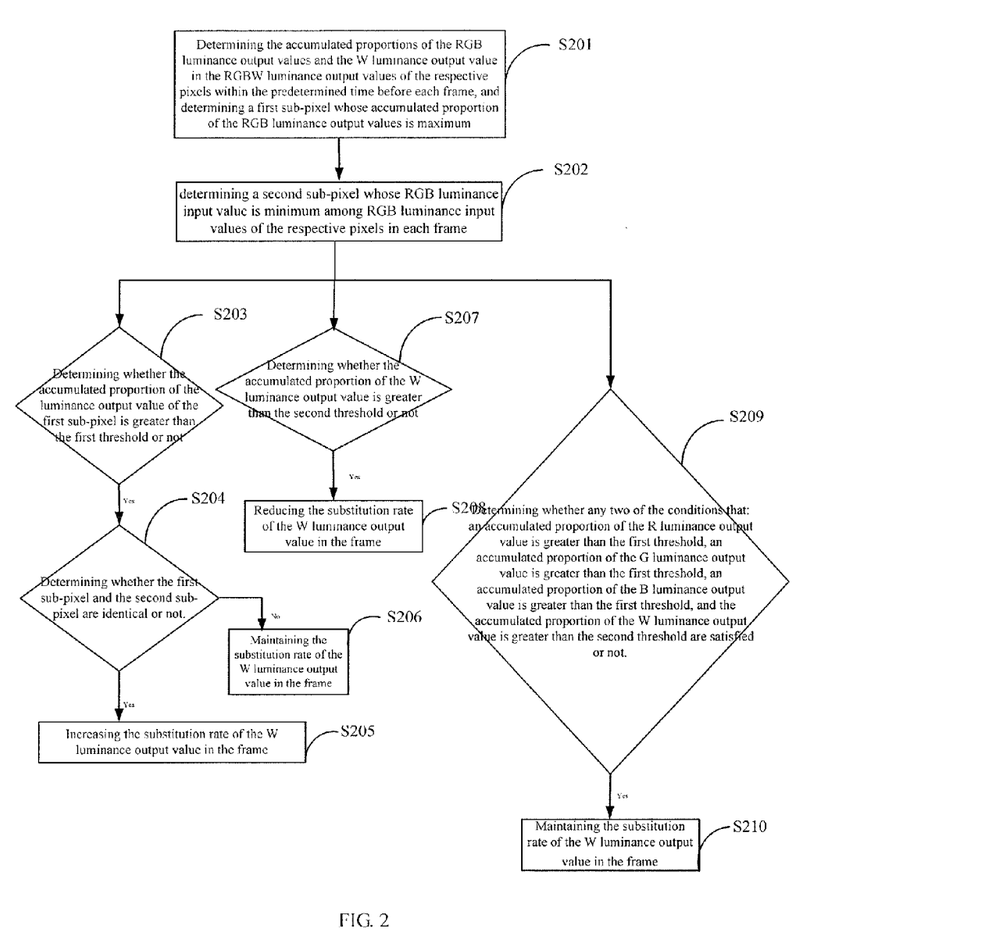
FIG. 2 is a flow chart of outputting a substitution rate of a W luminance output value of respective pixels in the image conversion method in FIG. 1.

Specifically, in step S102 of the above-described method provided by the embodiment of the present disclosure, the substitution rate of the W luminance output value of the respective pixels in each frame is determined according to the RGB luminance input values of the respective pixels in each frame, and the accumulated proportions of the RGB luminance output values and the W luminance output value in the RGBW luminance output values of the respective pixels within the preset time before each frame. As shown in FIG. 2, step S102 can be implemented by steps as below.

S201: determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum.

Specifically, the preset time can be set according to actual requirements and processing capacity of a display chip, that is, the preset time may specifically be display time of one frame or display time of a plurality of frames; and may also be a day, a month or a year, etc., which will not be limited here.

Upon actual implementation, firstly, the RGB luminance output values $L_X$ (where, X=R, G, or B) and the W luminance output value $L_W$ of the respective pixels in each frame within the preset time t before each frame are summed up, to derive an accumulated value $F_X = \Sigma_0^t L_X$ of the RGB luminance output values and an accumulated value $F_W = \Sigma_0^t L_W$ of the W luminance output value in the RGBW luminance output values of the respective pixels within the preset time t before each frame. Then, an accumulated proportion $K_X$ of the RGB luminance output values and an accumulated proportion $K_W$ of the W luminance output value in the RGBW luminance output values of the respective pixels within the preset time t before each frame are calculated by formulae $$K_X = \frac{F_X}{F_R + F_G + F_B + F_W} \text{ and } K_W = \frac{F_W}{F_R + F_G + F_B + F_W},$$

respectively. Finally, a sub-pixel corresponding to a maximum value of the accumulated proportion Kx of the three RGB luminance output values is determined as the first sub-pixel.

S202: determining a second sub-pixel whose RGB luminance input value is minimum among RGB luminance input values of the respective pixels in each frame;

Specifically, by comparing the RGB luminance input values $R_i$, $G_i$ and $B_i$ of the respective pixels in each frame, a sub-pixel corresponding to the minimum value of these three values can be determined as the second sub-pixel. For example, when $R_i$ in the present frame is minimum, R is determined as the second sub-pixel;

It should be noted that, there is no specific order between step S201 and step S202 as described above, which will not be limited here. After steps S201 and S202 are executed, step S203, step S207 and step S209 are executed, respectively.

In S203, it is determined whether the accumulated proportion of the luminance output value of the first sub-pixel is greater than the first threshold or not. If so, step S204 is executed. That is, in step S203, it is determined whether luminance of the first sub-pixel having maximum accumulated proportion of the luminance output value in a pixel within the preset time before the present frame exceeds the first threshold or not. And when being specifically implemented, the first threshold is generally controlled in a range from ⅓ to 0.6, which will not be limited here. Preferably, a typical value of the first threshold is 0.4.

In S204, it is determined whether the first sub-pixel and the second sub-pixel are identical or not. If so, step S205 is executed. If not, step S206 is executed.

In S205, the substitution rate of the W luminance output value in the frame is increased. That is, if the accumulated proportion of the red luminance output value in a pixel within the preset time before the present frame is maximum and is greater than the first threshold, and the luminance input value of the red sub-pixel in the pixel in the present frame is minimum, then the substitution rate of the W luminance output value of the pixel in the present frame is increased. For example, the substitution rate of the W luminance output value of the pixel in the present frame may be increased to 1. Thus, the luminance output of R is completely substituted by the luminance output of W, so as to adjust the working lives of the respective sub-pixels as a whole to maintain them substantially uniform, and to further improve the service life of the entire display.

In S206, the substitution rate of the W luminance output value in the frame is maintained. In actual implementation, an initial value of the substitution rate of the W luminance output value of the respective pixels in the respective frames is generally set to 0.6, which will not be limited here. For example, if the accumulated proportion of the red luminance output value in a pixel within the preset time before the present frame is maximum and is greater than the first threshold, but the luminance input value of the green sub-pixel in the pixel in the present frame is minimum, then the substitution rate of the W luminance output value of the pixel in the present frame is maintained. That is, the substitution rate of the W luminance output value of the pixel in the present frame can be maintained at the initial value 0.6.

In S207, it is determined whether the accumulated proportion of the W luminance output value is greater than the second threshold or not. If so, step S208 is executed. That is, it is determined whether luminance of the white sub-pixel in a pixel within the preset time before the present frame exceeds a threshold or not in this step. In actual implementation, the second threshold is generally controlled to be in a range from 0.4 to 0.6, which will not be limited here. Preferably, a typical value of the second threshold is 0.5;

In S208, the substitution rate of the W luminance output value in the frame is reduced. That is, if the accumulated proportion of the white luminance output value in a pixel within the preset time before the present frame is maximum and is greater than the second threshold, which indicates the utilization rate of the white sub-pixel is relatively high within a period of time before the present frame, then the substitution rate of the W luminance output value of the pixel in the present frame is reduced, that is, the utilization rate of the white sub-pixel is correspondingly reduced in the present frame. For example, the substitution rate of the W luminance output value of the pixel in the present frame can be reduced to 0.4, so as to adjust the working lives of the respective sub-pixels as a whole to maintain them substantially uniform, and to further improve the service life of the entire display.

In S209, it is determined whether any two or more of conditions as follow are satisfied or not: an accumulated proportion of the R luminance output value is greater than the first threshold, an accumulated proportion of the G luminance output value is greater than the first threshold, an accumulated proportion of the B luminance output value is greater than the first threshold, and the accumulated proportion of the W luminance output value is greater than the second threshold. If so, step S210 is executed. That is, it is determined that luminance of any two, three or four types of sub-pixels among the red, green, blue or white sub-pixels in a pixel within the preset time before the present frame exceeds threshold in step S209. In actual implementation, the first threshold is generally controlled in a range from ⅓ to 0.6, and the second threshold is controlled in a range of 0.4-0.6, which will not be limited here. Preferably, the typical value of the first threshold is 0.4, and the typical value of the second threshold is 0.5.

In S210, the substitution rate of the W luminance output value in the frame is maintained. In actual implementation, the initial value of the substitution rate of the W luminance output value of the respective pixels in the respective frames may be set to 0.6, which will not be limited here. For example, if the accumulated proportions of the red luminance output value and the green luminance output value in a pixel within the preset time before the present frame are both greater than the first threshold, then the substitution rate of the W luminance output value of the pixel in the present frame is maintained, i.e., the substitution rate of the W luminance output value of the pixel in the present frame can be maintained at the initial value 0.6.

In above-described step S201-step S210 of determining the substitution rate of the W luminance output value of the respective pixels in each frame provided by the embodiment of the present disclosure, by adjusting the numerical values of the first threshold in step S203 and the second threshold in step S207, it can be ensured that the accumulated proportion of the luminance output value of the first sub-pixel being greater than the first threshold in step S203 and the accumulated proportion of the W luminance output value being greater than the second threshold in step S207 are mutually complementary conditions; i.e., they can be satisfied alternatively, but not simultaneously. However, if the first threshold and the second threshold are selected improperly, there may be a case that any two or more of the conditions as follows are satisfied: the accumulated proportion of the R luminance output value is greater than the first threshold, the accumulated proportion of the G luminance output value is greater than the first threshold, the accumulated proportion of the B luminance output value is greater than the first threshold, and the accumulated proportion of the W luminance output value is greater than the second threshold. Thus, program execution errors can be avoided by steps S209 and S210.

In step S103 of the above-described method provided by the embodiment of the present disclosure, the RGBW luminance output values of the respective pixels in each frame are determined according to the determined substitution rate of the W luminance output value and the RGB luminance input values of the respective pixels in each frame, and in actual implementation, there are specifically four cases as follows.

(1) When it is determined that the accumulated proportion of the R luminance output value is greater than the first threshold, the RGBW luminance output values of the respective pixels in each frame are calculated by formulae below:

$$L_R = L_r - K_W L_r;$$

$$L_G = L_g - K_W L_r;$$

$$L_B = L_b - K_W L_r;$$

$$L_W = K_W L_r;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; and $K_W$ represents the substitution rate of the W luminance output value of the respective pixels in each frame.

Specifically, when it is determined that the accumulated proportion $K_R$ of the red luminance output value in the RGBW luminance output values of a pixel within the preset time before the present frame is maximum, and that the red luminance input value $R_r$ in the RGB luminance input values of the pixel in the present frame is minimum, the substitution rate of the W luminance output value of the pixel in the present frame is increased to 1. At this time, the RGBW luminance output values of the pixel in the present frame are:

$$L_R = 0; L_G = L_g - L_r; L_B = L_b - L_r; L_W = L_r;$$

As can be seen from the above formulae, the luminance output of R is completely substituted by the luminance output of W in the pixel in the present frame, so as to adjust the working lives of the respective sub-pixels as a whole to maintain them substantially uniform, and to further improve the service life of the entire display.

Specifically, the substitution rate of the W luminance output value of the pixel in the present frame is maintained at the initial value 0.6, when it is determined that the accumulated proportion $K_R$ of the red luminance output value in the RGBW luminance output values in a pixel within the preset time before the present frame is maximum, and that the green luminance input value G, or the blue luminance input value $B_i$ in the RGB luminance input values of the pixel in the present frame is minimum.

(2) When it is determined that the accumulated proportion of the G luminance output value is greater than the first threshold, the RGBW luminance output values of the respective pixels in each frame are calculated by formulae below:

$$L_R=L_r-K_W L_g;$$

$$L_G=L_g-K_W L_g;$$

$$L_B=L_b-K_W L_g;$$

$$L_W=K_W L_g;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; and $K_W$ represents the substitution rate of the W luminance output value of the respective pixels in each frame.

Specifically, when it is determined that the accumulated proportion $K_G$ of the green luminance output value in the RGBW luminance output values of a pixel within the preset time before the present frame is maximum, and that the green luminance input value G, in the RGB luminance input values of the pixel in the present frame is minimum, the substitution rate of the W luminance output value of the pixel in the present frame is increased to 1. At this time, the RGBW luminance output values of the pixel in the present frame are:

$$L_R=L_r-L_g; L_G=0; L_B=L_b-L_g; L_W=L_g;$$

As can be seen from the above formulae, the luminance output of G is completely substituted by the luminance output of W in the pixel in the present frame, so as to adjust the working lives of the respective sub-pixels as a whole to maintain them substantially uniform, and to further improve the service life of the entire display.

Specifically, the substitution rate of the W luminance output value of the pixel in the present frame is maintained at the initial value 0.6, when it is determined that the accumulated proportion $K_G$ of the green luminance output value in the RGBW luminance output values in a pixel within the preset time before the present frame is maximum, and that the red luminance input value $R_i$ or the blue luminance input value $B_i$ in the RGB luminance input values of the pixel in the present frame is minimum.

(3) When it is determined that the accumulated proportion of the B luminance output value is greater than the first threshold, the RGBW luminance output values of the respective pixels in each frame are calculated by formulae below:

$$L_R=L_r-K_W L_b;$$

$$L_G=L_g-K_W L_b;$$

$$L_B=L_b-K_W L_b;$$

$$L_W=K_W L_b;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; and $K_W$ represents the substitution rate of the W luminance output value of the respective pixels in each frame.

Specifically, when it is determined that the accumulated proportion $K_B$ of the blue luminance output value in the RGBW luminance output values of a pixel within the preset time before the present frame is maximum, and the blue luminance input value $B_i$ in the RGB luminance input values of the pixel in the present frame is minimum, the substitution rate of the W luminance output value of the pixel in the present frame is increased to 1. At this time, the RGBW luminance output values of the pixel in the present frame are:

$$L_R=L_r-L_b; L_G=L_g-L_b; L_B=0; L_W=L_b;$$

As can be seen from the above formulae, the luminance output of B is completely substituted by the luminance output of W in the pixel in the present frame, so as to adjust the working lives of the respective sub-pixels as a whole to maintain them substantially uniform, and to further improve the service life of the entire display.

Specifically, the substitution rate of the W luminance output value of the pixel in the present frame is maintained at the initial value 0.6, when it is determined that the accumulated proportion $K_B$ of the blue luminance output value in the RGBW luminance output values in a pixel within the preset time before the present frame is maximum, and that the red luminance input value $R_i$ or the green luminance input value $G_i$ in the RGB luminance input values of the pixel in the present frame is minimum.

(4) When it is determined that the accumulated proportion of the W luminance output value is greater than the second threshold, the RGBW luminance output values of the respective pixels in each frame are calculated by formulae below:

$$L_R=L_r-K_W L_x;$$

$$L_G=L_g-K_W L_x;$$

$$L_B=L_b-K_W L_x;$$

$$L_W=K_W L_x;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; $L_x$ represents a luminance input value of the second sub-pixel of the respective pixels in each frame; and $K_{W'}$ represents the substitution rate of the W luminance output value of the respective pixels in each frame.

When being specifically implemented, the RGBW luminance output values in the four cases may be calculated by the above-described specific formulae, respectively, and the RGBW luminance output values in the four cases may also be calculated by other formulae, which will not be limited here.

Specifically, in step S104 of the above-described method provided by the embodiment of the present disclosure, the determined RGBW luminance output values of the respective pixels in each frame are converted into the corresponding RGBW output signals, respectively, and outputted. In actual implementation, it can be implemented in a mode of reverse gamma conversion, i.e., the RGBW luminance output values can be converted into the corresponding RGBW output signals, respectively, by formulae below:

$$R_0 = \left(\frac{L_R}{L_{R\,max}}\right)^{\frac{1}{\gamma}} \times 255;$$

$$G_0 = \left(\frac{L_G}{L_{G\,max}}\right)^{\frac{1}{\gamma}} \times 255;$$

$$B_0 = \left(\frac{L_B}{L_{B\,max}}\right)^{\frac{1}{\gamma}} \times 255;$$

$$W_0 = \left(\frac{L_W}{L_{W\,max}}\right)^{\frac{1}{\gamma}} \times 255;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $R_0$ represents a red output signal value in the RGBW output signal, $G_0$ represents a green output signal value in the RGBW output signal, $B_0$ represents a blue output signal value in the RGBW output signal, $W_0$ represents a white output signal value in the RGBW output signal; $L_{Rmax}$ represents a red luminance maximum value, $L_{Gmax}$ represents a green luminance maximum value, $L_{Bmax}$ represents a blue luminance maximum value, $L_{Wmax}$ represents a white luminance maximum value, and $\gamma$ represents a gamma conversion factor.

Generally, upon actual calculation, the gamma conversion factor $\gamma$ is set to 2.2, and of course, it may also be set to any other numerical value according to actual requirements, which will not be limited here.

Based on the same inventive concept, an embodiment of the present disclosure further provides an image conversion method for converting RGB signal to RGBW signal. Since a principle on which the apparatus solves the problem is similar to that of the foregoing image conversion method for converting RGB signal to RGBW signal, the implementation of the method can be referred to for implementing the apparatus, and the repeated parts will not be described any longer.

Figure 3:
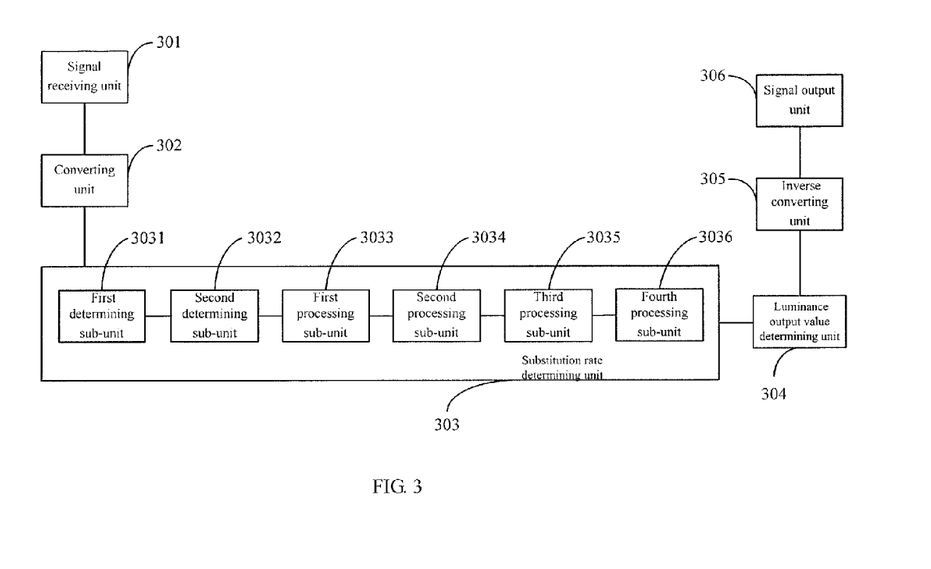
FIG. 3 is a structural schematic diagram of an image conversion apparatus for converting RGB signal to RGBW signal provided by an embodiment of the present disclosure.

The embodiment of the present disclosure further provides an image conversion apparatus for converting RGB signal to RGBW signal. As shown in FIG. 3, the image conversion apparatus comprises: a signal receiving unit 301, for receiving RGB input signals of respective pixels in each frame; a converting unit 302, for converting the received RGB input signals of the respective pixels in each frame into corresponding RGB luminance input values, respectively; a substitution rate determining unit 303, for determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame; a luminance output value determining unit 304, for determining the RGBW luminance output values of the respective pixels in each frame, according to the determined substitution rate of the W luminance output value and the RGB luminance input values of the respective pixels in each frame; an inverse converting unit 305, for converting the RGBW luminance output values of the respective pixels in each frame into corresponding RGBW output signals, respectively; and a signal output unit 306, for outputting the RGBW output signals of the respective pixels in each frame.

Further, the substitution rate determining unit 303 in the above-described apparatus provided by the embodiment of the present disclosure, as shown in FIG. 3, may specifically include: a first determining sub-unit 3031, a second determining sub-unit 3032, a first processing sub-unit 3033, a second processing sub-unit 3034, a third processing sub-unit 3035 and a fourth processing sub-unit 3036.

The first determining sub-unit 3031 is used for determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum.

The second determining sub-unit 3032 is used for determining a second sub-pixel whose luminance input value is minimum among RGB luminance input values of the respective pixels in each frame.

The first processing sub-unit 3033 is used for increasing the substitution rate of the W luminance output value in the frame, when it is determined that the accumulated proportion of the luminance output value of first sub-pixel is greater than a first threshold, and that the first sub-pixel is the second sub-pixel.

The second processing sub-unit 3034 is used for maintaining the substitution rate of the W luminance output value in the frame, when it is determined that the accumulated proportion of the luminance output value of first sub-pixel is greater than the first threshold, and that the first sub-pixel is different from the second sub-pixel.

The third processing sub-unit 3035 is used for reducing the substitution rate of the W luminance output value in the frame, when it is determined that the accumulated proportion of the W luminance output value is greater than the second threshold.

The fourth processing sub-unit 3036 is used for maintaining the substitution rate of the W luminance output value in the frame, when it is determined that any two or more of conditions as follows are satisfied: an accumulated proportion of an R luminance output value is greater than the first threshold, an accumulated proportion of a G luminance output value is greater than the first threshold, an accumulated proportion of a B luminance output value is greater than the first threshold, and the accumulated proportion of the W luminance output value is greater than the second threshold.

Further, the luminance output value determining unit 304 in the above-described apparatus provided by the embodiment of the present disclosure may be specifically used for calculating the RGBW luminance output values of the respective pixels in each frame by formulae below, when it is determined that the accumulated proportion of the R luminance output value is greater than the first threshold:

$$L_R = L_r - K_W L_r;$$

$$L_G = L_g - K_W L_r;$$

$$L_B = L_b - K_W L_r;$$

$$L_W = K_W L_r;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input value of the respective pixels in each frame; $L_r$ represents the red luminance input value in the RGB luminance input values of the respective pixels in each frame, $L_g$ represents the green luminance input value in the RGB luminance input values of the respective pixels in each frame. $L_b$ represents the blue luminance input value in the RGB luminance input values of the respective pixels in each frame; and $K_{W'}$ represents the substitution rate of the W luminance output value of the respective pixels in each frame.

Further, the luminance output value determining unit 304 in the above-described apparatus provided by the embodiment of the present disclosure may be specifically used for calculating the RGBW luminance output values of the respective pixels in each frame by formulae below, when it is determined that the accumulated proportion of the G luminance output value is greater than the first threshold:

$$L_R = L_r - K_W L_g;$$

$$L_G = L_g - K_W L_g;$$

$$L_B = L_b - K_W L_g;$$

$$L_W = K_W L_g;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; and $K_{W'}$ represents the substitution rate of the W luminance output value of the respective pixels in each frame.

Further, the luminance output value determining unit 304 in the above-described apparatus provided by the embodiment of the present disclosure may be specifically used for calculating the RGBW luminance output values of the respective pixels in each frame by formulae below, when it is determined that the accumulated proportion of the B luminance output value is greater than the first threshold:

$$L_R = L_r - K_W L_b;$$

$$L_G = L_g - K_W L_b;$$

$$L_B = L_b - K_W L_b;$$

$$L_W = K_W L_b;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input value of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; and $K_{W'}$ represents the substitution rate of the W luminance output value of the respective pixels in each frame.

Further, the luminance output value determining unit 304 in the above-described apparatus provided by the embodiment of the present disclosure may be specifically used for calculating the RGBW luminance output values of the respective pixels in each frame by formulae below, when it is determined that the accumulated proportion of the W luminance output value is greater than the second threshold:

$$L_R = L_r - K_W L_x;$$

$$L_G = L_g - K_W L_x;$$

$$L_B = L_b - K_W L_x;$$

$$L_W = K_W L_x;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; $L_x$ represents a luminance input value of the second sub-pixel of the respective pixels in each frame; and $K_{W'}$ represents the substitution rate of the W luminance output value of the respective pixels in each frame.

Further, the converting unit 302 in the above-described apparatus provided by the embodiment of the present disclosure may be specifically used for respectively converting the received RGB input signals of the respective pixels in each frame into the corresponding RGB luminance input values by formulae below:

$$L_r = L_{R\,max} \times \left(\frac{R_i}{255}\right)^{\gamma}; L_g = L_{G\,max} \times \left(\frac{G_i}{255}\right)^{\gamma}; L_b = L_{B\,max} \times \left(\frac{B_i}{255}\right)^{\gamma};$$

Where, $L_r$ represents the red luminance input value in the RGB luminance input values of the respective pixels in each frame, $L_g$ represents the green luminance input value in the RGB luminance input values of the respective pixels in each frame, $L_b$ represents the blue luminance input value in the RGB luminance input values of the respective pixels in each frame; $R_i$ represents a red input signal value in the RGB input signals of the respective pixels in each frame, $G_i$ represents a green input signal value in the RGB input signals of the respective pixels in each frame, $B_i$ represents a blue input signal value in the RGB input signals of the respective pixels in each frame; $L_{Rmax}$ represents a red luminance maximum value, $L_{Gmax}$ represents a green luminance maximum value, $L_{Bmax}$ represents a blue luminance maximum value, and $\gamma$ represents a gamma conversion factor.

Generally, upon actual calculation, the gamma conversion factor $\gamma$ is set to 2.2, and of course, it may also be set to any other numerical value according to actual requirements, which will not be limited here.

Further, the inverse converting unit 305 in the above-described apparatus provided by the embodiment of the present disclosure may be specifically used for converting the RGBW luminance output values of the respective pixels in each frame into corresponding RGBW output signals, respectively, by formulae below:

$$R_0 = \left(\frac{L_R}{L_{R\,max}}\right)^{\frac{1}{\gamma}} \times 255;$$

$$G_0 = \left(\frac{L_G}{L_{G\,max}}\right)^{\frac{1}{\gamma}} \times 255;$$

$$B_0 = \left(\frac{L_B}{L_{B\,max}}\right)^{\frac{1}{\gamma}} \times 255;$$

$$W_0 = \left(\frac{L_W}{L_{W\,max}}\right)^{\frac{1}{\gamma}} \times 255;$$

Where, $L_R$ represents the red luminance output value in the RGBW luminance output values of the respective pixels in each frame, $L_G$ represents the green luminance output value in the RGBW luminance output values of the respective pixels in each frame, $L_B$ represents the blue luminance output value in the RGBW luminance input values of the respective pixels in each frame, $L_W$ represents the white luminance output value in the RGBW luminance input values of the respective pixels in each frame; $R_0$ represents a red output signal value in the RGBW output signals, $G_0$ represents a green output signal value in the RGBW output signals, $B_0$ represents a blue output signal value in the RGBW output signals, $W_0$ represents a white output signal value in the RGBW output signals; $L_{Rmax}$ represents a red luminance maximum value, $L_{Gmax}$ represents a green luminance maximum value, $L_{Bmax}$ represents a blue luminance maximum value, $L_{Wmax}$ represents a white luminance maximum value, and $\gamma$ represents a gamma conversion factor.

Generally, upon actual calculation, the gamma conversion factor $\gamma$ is set to 2.2, and of course, it may also be set to any other numerical value according to actual requirements, which will not be limited here.

In actual implementation, the first threshold is generally controlled in a range from ⅓ to 0.6, and the second threshold is controlled in a range from 0.4 to 0.6, which will not be limited here. Preferably, the typical value of the first threshold is 0.4, and the typical value of the second threshold is 0.5.

Those skilled in the art can understand that the accompanying drawings are only the schematic diagrams of a preferred embodiment, the modules or the flows in the accompanying drawings may not be necessary to implement the present disclosure.

Those skilled in the art can understand that the modules of the apparatus in the embodiment can either be distributed in the apparatus in the embodiment according to the description of the embodiment, or be changed accordingly so as to be arranged in one or more apparatuses different from the present embodiment. The modules of the above-described embodiment can either be incorporated into one module, or be further split into a plurality of sub-modules.

The above serial numbers of the embodiments of the present disclosure are merely for description, but do not represent superiority or inferiority of the embodiments.

The embodiments of the present disclosure provide the image conversion method for converting RGB signal to RGBW signal and the image conversion apparatus. The received RGB input signals of the respective pixels in each frame are converted into the corresponding RGB luminance input values, respectively; the substitution rate of the W luminance output value of the respective pixels in each frame is determined according to the RGB luminance input values of the respective pixels in each frame, and the accumulated proportions of the RGB luminance output values and the W luminance output value in the RGBW luminance output values of the respective pixels within the preset time before each frame; the RGBW luminance output values of the respective pixels in each frame is determined according to the determined substitution rate of the W luminance output value and the RGB luminance input values of the respective pixels in each frame; and the determined RGBW luminance output values of the respective pixels in each frame are converted into the corresponding RGBW output signals, respectively, and are output. Thus, the RGBW luminance output values of the respective pixels in the present frame can be adjusted according to the utilization rate of respective sub-pixels in the respective pixels within a period of time before each frame, so as to substantially maintain the working lives of the respective sub-pixels in the respective pixels uniform as far as possible, and to further improve the service life of the entire display.

It is evident that those skilled in the art can make various changes or modifications to the present disclosure without departing from the spirit and scope of the present disclosure. Thus, if these changes and modifications to the present disclosure are within the scope of the claims of the present disclosure and equivalent technologies, the present disclosure also intends to include all such changes and modifications within its scope.

The present application claims priority of Chinese Patent Application No. 201410241038.8 filed on May 30, 2014, the disclosure of which is incorporated herein by reference in its entirety as part of the present application.

What is claimed is:

1. An image conversion method for converting RGB signal to RGBW signal, comprising:
converting received RGB input signals of respective pixels in each frame into corresponding RGB luminance input values, respectively;
determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame;
determining the RGBW luminance output values of the respective pixels in each frame, according to the determined substitution rate of the W luminance output value and the RGB luminance input values of the respective pixels in each frame;
converting the determined RGBW luminance output values of the respective pixels in each frame into corresponding RGBW output signals, respectively, and outputting the same.

2. The method according to claim 1, wherein, the determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame, includes:
determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum;
determining a second sub-pixel whose RGB luminance input value is minimum among RGB luminance input values of the respective pixels in each frame;
increasing the substitution rate of the W luminance output value in the frame, when it is determined that the accumulated proportion of the luminance output value of the first sub-pixel is greater than a first threshold and that the first sub-pixel is the second sub-pixel;
maintaining the substitution rate of the W luminance output value in the frame, when it is determined that the accumulated proportion of the luminance output value of the first sub-pixel is greater than the first threshold and that the first sub-pixel is different from the second sub-pixel;
reducing the substitution rate of the W luminance output value in the frame, when it is determined that the accumulated proportion of the W luminance output value is greater than a second threshold;
maintaining the substitution rate of the W luminance output value in the frame, when it is determined that any two or more of conditions as follows are satisfied: an accumulated proportion of an R luminance output value is greater than the first threshold, an accumulated proportion of a G luminance output value is greater than the first threshold, an accumulated proportion of a B luminance output value is greater than the first threshold, and the accumulated proportion of the W luminance output value is greater than the second threshold.

3. The method according to claim 2, wherein, the determining the RGBW luminance output values of the respective pixels in each frame, according to the determined substitution rate of the W luminance output value and the RGB luminance input values of the respective pixels in each frame, specifically includes:
calculating the RGBW luminance output values of the respective pixels in each frame by formulae below when it is determined that the accumulated proportion of the R luminance output value is greater than the first threshold:

$L_R = L_r - K_W L_r;$ $L_G = L_g - K_W L_r;$ $L_B = L_b - K_W L_r;$ $L_W = K_W L_r;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_W$ represents the substitution rate of the W luminance output value of the respective pixels in each frame.

4. The method according to claim 2, wherein, the determining the RGBW luminance output values of the respective pixels in each frame, according to the determined substitution rate of the W luminance output value and the RGB luminance input values of the respective pixels in each frame, includes:
calculating the RGBW luminance output values of the respective pixels in each frame by formulae below when it is determined that the accumulated proportion of the G luminance output value is greater than the first threshold:

$L_R = L_r - K_W L_g;$ $L_G = L_g - K_W L_g;$ $L_B = L_b - K_W L_g;$ $L_W = K_W L_g;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

5. The method according to claim 2, wherein, the determining the RGBW luminance output values of the respective pixels in each frame, according to the determined substitution rate of the W luminance output value and the RGB luminance input values of the respective pixels in each frame, includes:

calculating the RGBW luminance output values of the respective pixels in each frame by formulae below when it is determined that the accumulated proportion of the B luminance output value is greater than the first threshold:

$L_R = L_r - K_W \cdot L_b;$ $L_G = L_g - K_W \cdot L_b;$ $L_B = L_b - K_W \cdot L_b;$ $L_W = K_W \cdot L_b;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

6. The method according to claim 2, wherein, the determining the RGBW luminance output values of the respective pixels in each frame, according to the determined substitution rate of the W luminance output value and the RGB luminance input values of the respective pixels in each frame, includes:

calculating the RGBW luminance output values of the respective pixels in each frame by formulae below when it is determined that the accumulated proportion of the W luminance output value is greater than the second threshold:

$L_R = L_r - K_W \cdot L_x;$ $L_G = L_g - K_W \cdot L_x;$ $L_B = L_b - K_W \cdot L_x;$ $L_W = K_W \cdot L_x;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; $L_x$ represents a luminance input value of the second sub-pixel of the respective pixels in each frame; and $K_{W'}$ represents the substitution rate of the W luminance output value of the respective pixels in each frame.

7. The method according to claim 2, wherein, the first threshold ranges from ⅓ to 0.6, and the second threshold ranges from 0.4 to 0.6.

8. An image conversion apparatus for converting RGB signal to RGBW signal, comprising:
a signal receiver, for receiving RGB input signals of respective pixels in each frame;
a signal transmitter, for outputting RGBW output signals of the respective pixels in each frame;
a processor;
a memory that store computer program instruction, wherein, when the computer program instruction is run by the processor, functions to be performed includes:
converting the received RGB input signals of the respective pixels in each frame into corresponding RGB luminance input values, respectively;
determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame;
determining the RGBW luminance output values of the respective pixels in each frame, according to the determined substitution rate of the W luminance output value and the RGB luminance input values of the respective pixels in each frame;
converting the determined RGBW luminance output values of the respective pixels in each frame into corresponding RGBW output signals, respectively.

9. The image conversion apparatus according to claim 8, wherein, the determining a substitution rate of a W luminance output value of the respective pixels in each frame, according to the RGB luminance input values of the respective pixels in each frame, and accumulated proportions of RGB luminance output values and the W luminance output value in RGBW luminance output values of the respective pixels within a preset time before each frame includes:

determining the accumulated proportions of the RGB luminance output values and the W luminance output value in the RGBW luminance output values of the respective pixels within the preset time before each frame, and determining a first sub-pixel whose accumulated proportion of the RGB luminance output values is maximum;

determining a second sub-pixel whose RGB luminance input value is minimum among RGB luminance input values of the respective pixels in each frame;

increasing the substitution rate of the W luminance output value in the frame, when it is determined that the accumulated proportion of the luminance output value of the first sub-pixel is greater than a first threshold and that the first sub-pixel is the second sub-pixel;

maintaining the substitution rate of the W luminance output value in the frame, when it is determined that the accumulated proportion of the luminance output value of the first sub-pixel is greater than the first threshold and that the first sub-pixel is different from the second sub-pixel;

reducing the substitution rate of the W luminance output value in the frame, when it is determined that the accumulated proportion of the W luminance output value is greater than a second threshold;

maintaining the substitution rate of the W luminance output value in the frame, when it is determined that any two or more of conditions that an accumulated proportion of an R luminance output value is greater than the first threshold, an accumulated proportion of a G luminance output value is greater than the first threshold, an accumulated proportion of a B luminance output value is greater than the first threshold, and the accumulated proportion of the W luminance output value is greater than the second threshold, are satisfied.

10. The image conversion apparatus according to claim 9, wherein, the determining the RGBW luminance output values of the respective pixels in each frame, according to the determined substitution rate of the W luminance output value and the RGB luminance input values of the respective pixels in each frame includes:

calculating the RGBW luminance output values of the respective pixels in each frame by formulae below when it is determined that the accumulated proportion of the R luminance output value is greater than the first threshold:

$L_R = L_r - K_W L_r;$ $L_G = L_g - K_W L_r;$ $L_B = L_b - K_W L_r;$ $L_W = K_W L_r;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

11. The image conversion apparatus according to claim 9, wherein, the determining the RGBW luminance output values of the respective pixels in each frame, according to the determined substitution rate of the W luminance output value and the RGB luminance input values of the respective pixels in each frame includes:

calculating the RGBW luminance output values of the respective pixels in each frame by formulae below when it is determined that the accumulated proportion of the G luminance output value is greater than the first threshold:

$L_R = L_r - K_W L_g;$ $L_G = L_g - K_W L_g;$ $L_B = L_b - K_W L_g;$ $L_W = K_W L_g;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W'}$ represents the substitution rate of the W luminance output value of the respective pixels in each frame.

12. The image conversion apparatus according to claim 9, wherein, the determining the RGBW luminance output values of the respective pixels in each frame, according to the determined substitution rate of the W luminance output value and the RGB luminance input values of the respective pixels in each frame includes:

calculating the RGBW luminance output values of the respective pixels in each frame by formulae below when it is determined that the accumulated proportion of the B luminance output value is greater than the first threshold:

$L_R = L_r - K_W L_b;$ $L_G = L_g - K_W L_b;$ $L_B = L_b - K_W L_b;$ $L_W = K_W L_b;$ where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents the white luminance output values in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; and $K_{W''}$ represents the substitution rate of the W luminance output value of the respective pixels in each frame.

13. The image conversion apparatus according to claim 9, wherein, the determining the RGBW luminance output values of the respective pixels in each frame, according to the determined substitution rate of the W luminance output value and the RGB luminance input values of the respective pixels in each frame includes:
    calculating the RGBW luminance output values of the respective pixels in each frame by formulae below when it is determined that the accumulated proportion of the W luminance output value is greater than the second threshold:

$L_R = L_r - K_W L_x$;

$L_G = L_g - K_W L_x$;

$L_B = L_b - K_W L_x$;

$L_W = K_W L_x$;

where, $L_R$ represents a red luminance output value in the RGBW luminance output values of the respective pixels in each frame, $L_G$ represents a green luminance output value in the RGBW luminance output values of the respective pixels in each frame, $L_B$ represents a blue luminance output value in the RGBW luminance input values of the respective pixels in each frame, $L_W$ represents a white luminance output value in the RGBW luminance input values of the respective pixels in each frame; $L_r$ represents a red luminance input value in the RGB luminance input values of the respective pixels in each frame, $L_g$ represents a green luminance input value in the RGB luminance input values of the respective pixels in each frame, $L_b$ represents a blue luminance input value in the RGB luminance input values of the respective pixels in each frame; $L_x$ represents a luminance input value of the second sub-pixel of the respective pixels in each frame; and $K_{W''}$ represents the substitution rate of the W luminance output value of the respective pixels in each frame.

14. The image conversion apparatus according to claim 9, wherein, the first threshold ranges from ⅓ to 0.6, and the second threshold, ranges from 0.4 to 0.6.

* * * * *